United States Patent
Wooten (10) Patent No.: US 7,499,057 B2
(45) Date of Patent: Mar. 3, 2009

(54) ADDRESS TRANSLATION IN AN INTEGRATED GRAPHICS ENVIRONMENT

(75) Inventor: David R. Wooten, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 455 days.

(21) Appl. No.: 11/222,551

(22) Filed: Sep. 9, 2005

(65) Prior Publication Data

US 2007/0057957 A1    Mar. 15, 2007

(51) Int. Cl.
G06F 12/10 (2006.01)
G06F 9/26 (2006.01)

(52) U.S. Cl. ...................... 345/568; 711/203

(58) Field of Classification Search ................ 345/568; 711/203
See application file for complete search history.

(56) References Cited

U.S. PATENT DOCUMENTS

| | | | |
|---|---|---|---|
| 6,593,932 B2* | 7/2003 | Porterfield | 345/568 |
| 6,717,582 B2* | 4/2004 | Jeddeloh | 345/532 |
| 6,741,258 B1* | 5/2004 | Peck et al. | 345/568 |
| 6,947,051 B2* | 9/2005 | Gossalia et al. | 345/543 |
| 7,050,061 B1* | 5/2006 | Baldwin | 345/552 |
| 2005/0231515 A1* | 10/2005 | Gurumoorthy et al. | 345/520 |
| 2006/0139360 A1* | 6/2006 | Panesar et al. | 345/568 |

* cited by examiner

Primary Examiner—Ryan R Yang
(74) Attorney, Agent, or Firm—Woodcock Washburn LLP (57) ABSTRACT

A method of translating graphics virtual addresses to physical addresses in an integrated graphics processor environment includes receiving a request for a graphics operation from an application. The application may be an application executing in a partition of a virtual machine. The requested graphics operation involves at least one instruction and at least one graphics virtual address. The instructions are accessed and execution begins by instruction execution within a graphics processor. The graphics processor relies upon an I/O memory management unit to perform a virtual address to physical address translation as the graphics processor performs the graphics operation. The I/O memory management unit may utilize direct memory access to accomplish the graphics operation.

17 Claims, 4 Drawing Sheets

ADDRESS TRANSLATION IN AN INTEGRATED GRAPHICS ENVIRONMENT

BACKGROUND OF THE INVENTION

Virtual computing allows multiple virtual machines, each having their own operating system, to run on a host computer. The host computer has a virtualizer program that can virtualize the hardware resources of the host machine for virtual machine use. The virtual machine that is requesting hardware resources such as CPU, memory, I/O and disk space is called a guest with respect to the host computer. In a virtual machine, the guest computer system may only exists in the host computer system as a pure software representation of the operation of one specific hardware architecture. In some instances, a virtual machine may have direct access to specific hardware such as an IO device. A virtualizer program executing on the operating system software and hardware architecture of the host computer mimics the operation of the appropriate portions of the guest computer system.

When a guest accesses virtual hardware, the virtualizer program intercedes and provides emulation or translation of the virtualized device. In one virtual machine environment embodiment, the emulated environment may include a virtual machine monitor (VMM) which is a software layer that runs directly above the host hardware, perhaps running side-by-side and working in conjunction with the host operating system, and which can virtualize all the resources of the host machine (as well as certain virtual resources) by exposing interfaces that are the same as the hardware the VMM is virtualizing In a virtual machine environment, the multiple virtual machines impose functional requirements on the hardware resources of the host machine. For example, it is desirable to keep one virtual machine separated from the other virtual machines as well as separated from the host. Separation or isolation of one virtual machine from another is useful to segregate errors and faults such that one virtual machine fault does not affect another virtual machine.

In one configuration, a guest virtual machine may attempt to access graphics that is virtualized. Typical graphics support in the host computer includes a graphics processor unit (GPU) that has its own memory separate from the CPU or main memory. Often, the GPU is connected to the host CPU via an interface, such as PCI, that interconnects the CPU board and the separate graphics processor board.

In many existing systems, the GPU accesses memory through a graphics address resolution table (GART). The GART allows the GPU to access disjoint physical memory as if it were linearly contiguous. This mechanism provides to the GPU a mechanism that is similar to the address translation that is provided to the CPU by the memory management unit (MMU). Implementation of GART only provides for one set of translation tables so there is but a single graphics context that is shared among all applications that use graphics. A user mode application would submit its graphics commands to a kernel mode driver which would then translate the addresses used in the commands from the user mode space, to the single GPU context defined by the GART. Newer systems will provide a more flexible scheme of addressing which allows multiple graphics contexts to be defined. A user mode application would be assigned a graphics context. The application would create graphics commands within that context and submit them to the GPU for execution. When the GPU executed the commands associated with a specific context, it will insure that it is using the address translation table that is associated with that user mode application. This avoids the time consuming step of command editing by the kernel-mode graphics driver.

The multi-context, translation hardware (GMMU) that is used by the GPU is normally included as part of the graphics subsystem and programming of the GMMU is normally a function of the kernel-mode graphics driver. In systems that have multiple virtual machines, it should not be possible for the kernel-mode graphics driver in one virtual machine to have unrestricted access to memory in other virtual machines which it would have if the GMMU were able to reference main system memory directly. To prevent unlimited access to system memory by graphics (or any other IO device) systems include hardware that will filter accesses to main system memory by IO devices. This filtering is performed by the IO memory management unit (IOMMU) and may be as simple as a one-bit access check, or as complex as an address translation. In the case where the IOMMU is doing a full address translation, there is the possibility that a GPU access will first be translated by the GMMU and translated again by the IOMMU before being able to access main system memory.

The recent move to more integrated host CPU chipsets which incorporate the graphics card and has no memory dedicated to the GPU. In this case, the tables used by the GMMU are in main system memory. If the approach to graphics were not changed, then the accesses to main system memory by the GMMU in order to fetch entries in the graphics translation table would have to be translated by the IOMMU and then the resulting address computed by the GMMU would have to be translated again by the IOMMU. If each GMMU assess required two accesses (a two-level table) and each IOMMU access required three accesses, this would result in a total of 9 memory cycles to resolve and address and access the graphics data. This is much too much overhead for the high-performance demands of graphics.

Thus, there is a need for an improved method of providing address translations for graphics processes in an integrated graphics chipset environment. Preferably, this improvement may be applicable to virtual machine environments as well as non-virtual machine environments.

SUMMARY

An aspect of the invention includes a method to provide a translation between a graphics virtual or physical address and a system physical address. In one embodiment, the invention may be used in a virtual machine environment where an application in a guest partition of the generates a request for a graphics operations. When executed by the GPU, the graphics operations will reference memory locations in the application-specific, graphics context. When the GPU is part of the chipset, main memory is used for the tables that translate the addresses from each graphics context into main memory addresses.

DETAILED DESCRIPTION OF ILLUSTRATIVE EMBODIMENTS

Exemplary Embodiments

In one embodiment of the invention, a graphics processor unit (GPU) may use direct memory access (DMA) to access main memory in a system that uses an integrated CPU and GPU chipset. However, the DMA may be speed inhibited because an address translation may be necessary. For example, in a virtual machine environment where the host CPU is an integrated graphics chipset without dedicated graphics memory, at least a second-level address translation is needed to generate a system physical address (SPA) from a guest virtual or physical address. In the context of a DMA, this address translation may be termed DMA remapping.

Microsoft® Corporation of Redmond Washington has developed a graphics standard called Advanced Scheduler™ that allows each application, in a virtual machine or stand alone computer application, to have its own graphics "context" (A "context" is an isolated execution environment). A kernel-mode driver is responsible for creating the graphics contexts in which the graphics processor (GPU) will execute a set of graphics commands produced by a user-level program. Because the contexts are isolated, the user-mode applications cannot see or change the graphics information produced by another user-mode application in a different graphics context.

The isolation of graphics contexts can be applied to a partitioned (virtual machine) system in which multiple, and possibly diverse, operating systems are running on virtualized computers. A master control program called a Virtual Machine Monitor or a Hypervisor insures that each of the partitions is isolated from the others in much the same way that a kernel enforces isolation between user-mode applications.

In one embodiment, some of the functions of the kernel are moved into a special partition (a GFx partition) that provides the graphics services to the other partitions though a special software interface. The GFx partition creates and manages the graphics contexts that are used by the other partitions. The GFx partition also manages the graphics hardware.

Normally, the GFx partition will describe a context with context-specific translation tables. These tables translate accesses by the GPU from the virtual address space of the graphics context into a system memory address. On a system without DMA remapping, the translation is from graphics virtual address into system physical address (actual addresses used to access system memory). On a system with DMA remapping, the graphics device is treated like any other I/O device and the addresses that are presented to memory are translated by tables created and managed by the Hypervisor. On a system with a separate graphics card, a significant portion of the memory used by the GPU is located on the graphics card itself and most memory accesses related to address translation are to that GPU-dedicated memory. In this latter type of system, the overhead of going through the DMA remapping translation required for a system memory access may be relatively insignificant.

For a system with an integrated graphics chipset, the GPU is not a separate card and thus the GPU may not have dedicated graphics memory. In such a system, all the accesses related to graphics function for the GPU are to main or system memory. The translation tables used by integrated graphics for the context description are in system memory and the ultimate "targets" of those access are also in system memory. This means that each access to system memory could result in multiple table lookups, with each lookup requiring multiple memory accesses, depending on the table depth. Thus, in a graphical I/O context, the use of DMA remapping for a graphic process may have reduced performance because of the multiple address translations needed.

In one embodiment of the invention, the process of translating from graphics context to system addresses when DMA remapping is present is simplified. The embodiment has the GFx partition create contexts that access system memory instead of graphics virtual space. This means that addresses are translated from graphics context space to system physical addresses in a single table walk with a DMA remapping. This remapper or translation function may be implemented in hardware. The advantage is to allow integrated graphics to run with minimal overhead while requiring no special casing of the VMM or Hypervisor to deal with graphics (the Hypervisor does not need to be modified to deal with the translation specifics of each graphics implementation).

Figure 1:
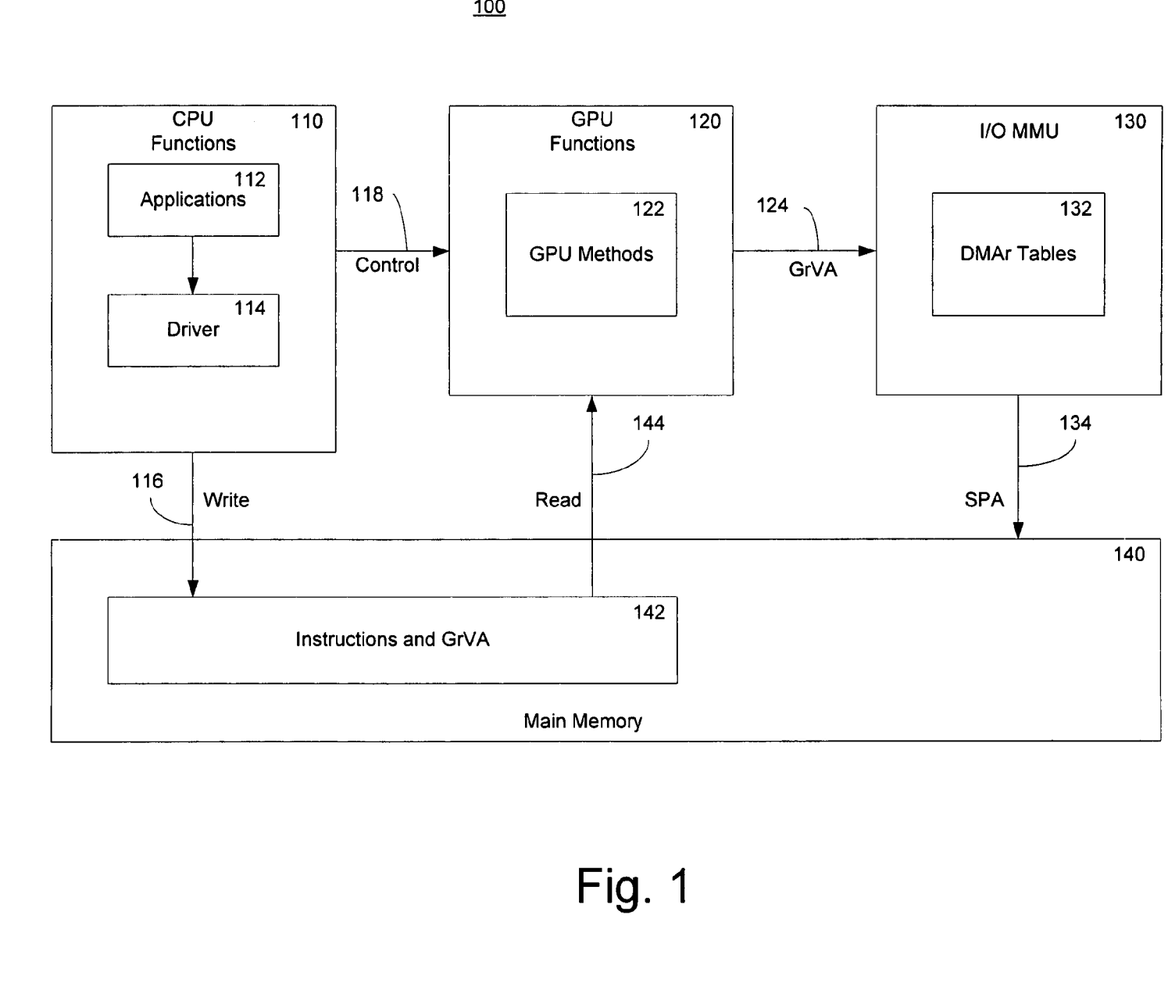
FIG. 1 is an example embodiment of a system which shows an translation aspect of the invention.

FIG. 1 depicts a system 100 having aspects of the invention. The system functions include CPU functions 110, GPU functions 120, an I/O Memory Management Unit 130, and main memory 140. An application 112 may be running either directly or via a virtualization on a host CPU to produce a graphics result. A driver 114 reacts to the application to command the graphics result. The driver 114 can write 116 into main (system) memory 140 a set of graphics instructions and graphics virtual addresses (GrVA) 142 that are intended to implement the graphics function that the application 112 and driver 114 request. Under control 118 from CPU functions, the GPU may begin execution 120 of GPU methods 122. Those methods may include reading 144 specific instructions and GrVA 142 from main memory 140. The GPU can then execute those instructions and GrVAs 142 according to the specific GPU methods 122.

If accesses are needed to main memory, the retrieved or processed GrVA are sent out by the GPU to perform the graphics function in a direct memory address (DMA) format. However, the GrVA format can not be used directly by the main memory 140. A GrVA to system physical address (SPA) translation is needed. An I/O Memory Management Unit (IOMMU) 130 containing the direct memory address remapping (DMAr) tables 132 is available to provide the GrVA to SPA translation so that the GPU may operate without having to perform the address translation itself. The GPU operates independently of the address translation. Stated another way, the address translation is transparent to the GPU. Thus, the system 100 provides an example mechanism whereby an application 112 and driver 114 generating only GrVAs and graphics instructions 142, may produce a graphics function using a GPU that only processes GrVAs and instructions. The GrVA and graphics instruction 142 may be executed by a GPU using an IOMMU 130 as a GVA to SPA address translation device such that main memory 140 may be accessed properly.

Figure 2:
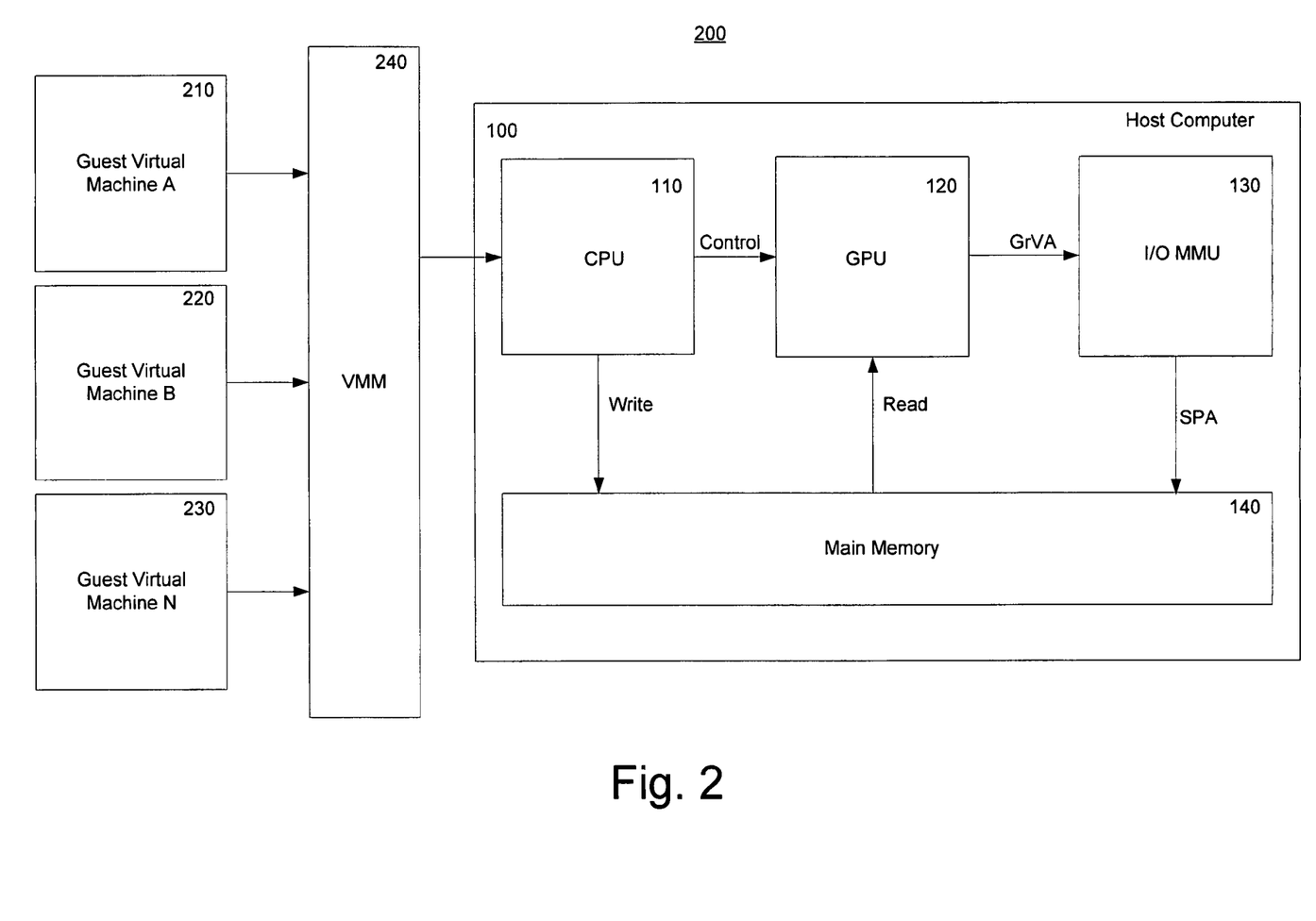
FIG. 2 is an example embodiment of a virtual machine environment having aspects of the invention.

FIG. 2 depicts an example system 200 that uses aspects of the invention in a virtual machine environment. The configuration 100 of FIG. 1 which includes a CPU functions 110, GPU functions 120, IOMMU functions 130, and main memory 140 represents a host computer in a virtual machine system 200. Guest virtual machines A, B and C 210, 220 and 230 respectively, may include guest applications that request a guest virtual machine related request to perform a graphics function. A virtualizer, hypervisor, or VMM 240 couples the guest virtual machine graphics request to the host computer 100. The guest virtual machine application is executed with the CPU function 110 of the host computer 100. The main memory 140 may be written into by the CPU 110 to record the guest applications' graphic instructions and guest graphics virtual addresses (GrVA). Once the GPU functions 120 begin operation, the GPU reads the GrVA, processes it as needed, and accesses main memory 140 via the IOMMU which perform the GrVA to SPA translations. As a result, the guest virtual machine can achieve the graphics function desired of the guest application using integrated graphics chipset of the host computer. Thus, aspects of the invention are useful in a virtual machine environment.

Figure 3:
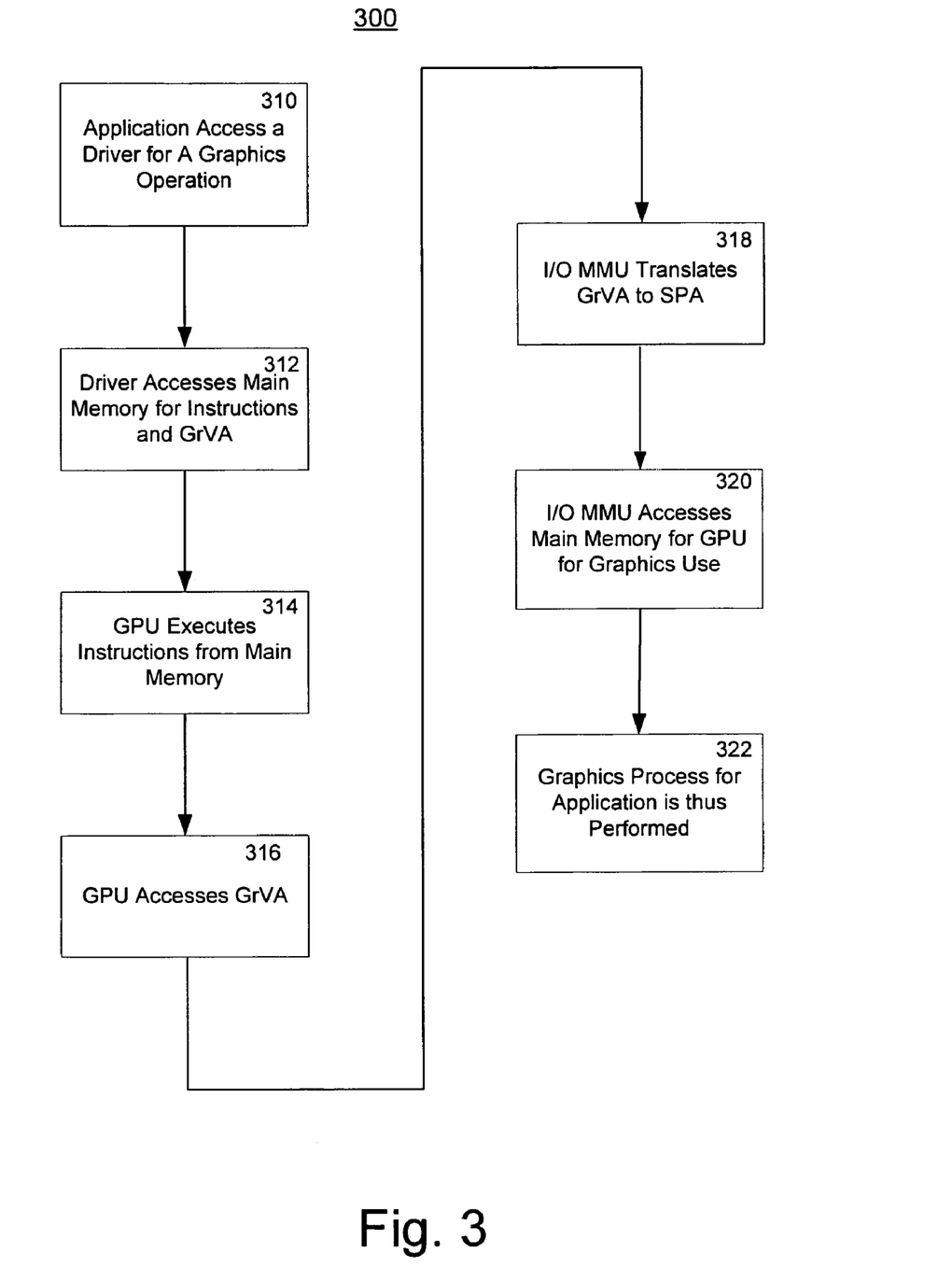
FIG. 3 is an example flow diagram of a process according to aspects of the invention.

FIG. 3 depicts an example method 300 according aspects of the invention. The method begins when an application access a driver to perform a graphics operation (step 310). The application may be either a stand alone application in a host computer or an application located in a virtual machine partition in a virtual machine environment. In either case, the driver for the application attempts to access main memory for graphics instructions and associated graphics virtual addresses (step 312). The application normally issues graphics commands with reference to virtual addresses (GrVA). Those instructions and associated graphics virtual addresses may be entered into main memory or referenced if the instructions and addresses are pre-loaded into main memory.

The graphics processor unit (GPU) function is initiated or called into action such that the instructions and graphics virtual addresses are executed from main memory (step 314). The GPU is assumed to be absent dedicated hardware, such as GPU local memory or a local GPU cache that may be used to hold address-translation hardware and software. In the execution process, information at graphics virtual address (GrVA) are accessed by the GPU (step 316) as if the GPU were addressing memory directly. Thus, the GPU may be unaware that an address translation between GrVA and SPA is needed to directly address main memory. Consequently, the GPU uses the GrVA directly and the I/O memory management unit (IOMMU) translates the GrVA into SPA (step 318). The IOMMU acts to use remapping tables within IOMMU main memory for the address translation. Thus, address translation occurs independently of the GPU. In one embodiment, the IOMMU may be a hardware device whereas in another embodiment, the IOMMU may be a software implementation. If the implementation is one of software, a computer readable medium may be used to store computer instructions of the software implementation.

In either event, the IOMMU accesses main memory for the GPU to assist in the performance of the graphics function (step 320). In one embodiment, the IOMMU allows the GPU to exercise a direct memory access remapping (DMAr) function to the main memory. The DMAr function allows the GPU to access main memory via the efficient DMA functionality, but adds an in-line remapping of addresses (GrVA to SPA) such that the GPU to main memory accesses are performed with a minimum of address conversion delay. Accordingly, a hardware based IOMMU is preferable over a software based IOMMU in DMA related embodiments. As a result of the address translation in step 318, the IOMMU access the main memory and the desired process for the application may be performed (step 322).

Exemplary Computing Device

Figure 4:
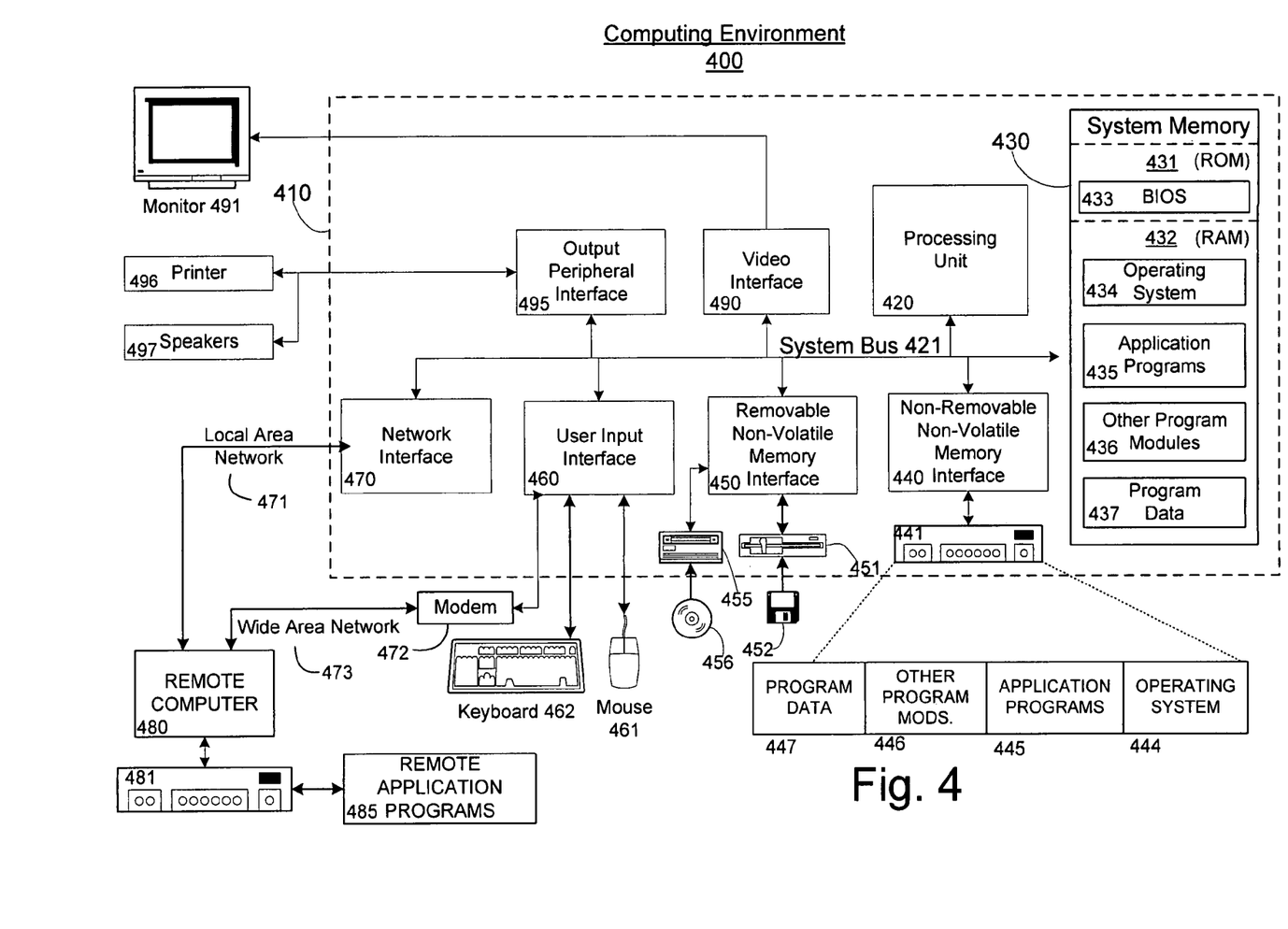
FIG. 4 is a block diagram showing an example computing environment in which aspects of the invention may be implemented.

FIG. 4 and the following discussion are intended to provide a brief general description of a suitable computing environment in which embodiments of the invention may be implemented. While a general purpose computer is described below, this is but one single processor example, and embodiments of the invention with multiple processors may be implemented with other computing devices, such as a client having network/bus interoperability and interaction. Thus, embodiments of the invention may be implemented in an environment of networked hosted services in which very little or minimal client resources are implicated, e.g., a networked environment in which the client device serves merely as an interface to the network/bus, such as an object placed in an appliance, or other computing devices and objects as well. In essence, anywhere that data may be stored or from which data may be retrieved is a desirable, or suitable, environment for operation.

Although not required, embodiments of the invention can also be implemented via an operating system, for use by a developer of services for a device or object, and/or included within application software. Software may be described in the general context of computer-executable instructions, such as program modules, being executed by one or more computers, such as client workstations, servers or other devices. Generally, program modules include routines, programs, objects, components, data structures and the like that perform particular tasks or implement particular abstract data types. Typically, the functionality of the program modules may be combined or distributed as desired in various embodiments. Moreover, those skilled in the art will appreciate that various embodiments of the invention may be practiced with other computer configurations. Other well known computing systems, environments, and/or configurations that may be suitable for use include, but are not limited to, personal computers (PCs), automated teller machines, server computers, hand-held or laptop devices, multi-processor systems, microprocessor-based systems, programmable consumer electronics, network PCs, appliances, lights, environmental control elements, minicomputers, mainframe computers and the like. Embodiments of the invention may also be practiced in distributed computing environments where tasks are performed by remote processing devices that are linked through a communications network/bus or other data transmission medium. In a distributed computing environment, program modules may be located in both local and remote computer storage media including memory storage devices and client nodes may in turn behave as server nodes.

With reference to FIG. 4, an exemplary system for implementing an embodiment of the invention includes a general purpose computing device in the form of a computer system 410. Components of computer system 410 may include, but are not limited to, a processing unit 420, a system memory 430, and a system bus 421 that couples various system components including the system memory to the processing unit 420. The system bus 421 may be any of several types of bus structures including a memory bus or memory controller, a peripheral bus, and a local bus using any of a variety of bus architectures.

Computer system 410 typically includes a variety of computer readable media. Computer readable media can be any available media that can be accessed by computer system 410 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, Random Access Memory (RAM), Read Only Memory (ROM), Electrically Erasable Programmable Read Only Memory (EEPROM), flash memory or other memory technology, Compact Disk Read Only Memory (CDROM), compact disc-rewritable (CDRW), digital versatile disks (DVD) or other optical disk storage, magnetic cassettes, magnetic tape, magnetic disk storage or other magnetic storage devices, or any other medium which can be used to store the desired information and which can accessed by computer system 410. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 430 includes computer storage media in the form of volatile and/or nonvolatile memory such as read only memory (ROM) 431 and random access memory (RAM) 432. A basic input/output system 433 (BIOS), containing the basic routines that help to transfer information between elements within computer system 410, such as during start-up, is typically stored in ROM 431. RAM 432 typically contains data and/or program modules that are immediately accessible to and/or presently being operated on by processing unit 420. By way of example, and not limitation, FIG. 4 illustrates operating system 434, application programs 435, other program modules 436, and program data 437.

The computer system 410 may also include other removable/non-removable, volatile/nonvolatile computer storage media. By way of example only, FIG. 4 illustrates a hard disk drive 441 that reads from or writes to non-removable, nonvolatile magnetic media, a magnetic disk drive 451 that reads from or writes to a removable, nonvolatile magnetic disk 452, and an optical disk drive 455 that reads from or writes to a removable, nonvolatile optical disk 456, such as a CD ROM, CDRW, DVD, or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 441 is typically connected to the system bus 421 through a non-removable memory interface such as interface 440, and magnetic disk drive 451 and optical disk drive 455 are typically connected to the system bus 421 by a removable memory interface, such as interface 450.

The drives and their associated computer storage media discussed above and illustrated in FIG. 4 provide storage of computer readable instructions, data structures, program modules and other data for the computer system 410. In FIG. 4, for example, hard disk drive 441 is illustrated as storing operating system 444, application programs 445, other program modules 446, and program data 447. Note that these components can either be the same as or different from operating system 434, application programs 435, other program modules 436, and program data 437. Operating system 444, application programs 445, other program modules 446, and program data 447 are given different numbers here to illustrate that, at a minimum, they are different copies. A user may enter commands and information into the computer system 410 through input devices such as a keyboard 462 and pointing device 461, commonly referred to as a mouse, trackball or touch pad. Other input devices (not shown) may include a microphone, joystick, game pad, satellite dish, scanner, or the like. These and other input devices are often connected to the processing unit 420 through a user input interface 460 that is coupled to the system bus 421, but may be connected by other interface and bus structures, such as a parallel port, game port or a universal serial bus (USB). A monitor 491 or other type of display device is also connected to the system bus 421 via an interface, such as a video interface 490, which may in turn communicate with video memory (not shown). In addition to monitor 491, computer systems may also include other peripheral output devices such as speakers 497 and printer 496, which may be connected through an output peripheral interface 495.

The computer system 410 may operate in a networked or distributed environment using logical connections to one or more remote computers, such as a remote computer 480. The remote computer 480 may be a personal computer, a server, a router, a network PC, a peer device or other common network node, and typically includes many or all of the elements described above relative to the computer system 410, although only a memory storage device 481 has been illustrated in FIG. 4. The logical connections depicted in FIG. 4 include a local area network (LAN) 471 and a wide area network (WAN) 473, but may also include other networks/buses. Such networking environments are commonplace in homes, offices, enterprise-wide computer networks, intranets and the Internet.

When used in a LAN networking environment, the computer system 410 is connected to the LAN 471 through a network interface or adapter 470. When used in a WAN networking environment, the computer system 410 typically includes a modem 472 or other means for establishing communications over the WAN 473, such as the Internet. The modem 472, which may be internal or external, may be connected to the system bus 421 via the user input interface 460, or other appropriate mechanism. In a networked environment, program modules depicted relative to the computer system 410, or portions thereof, may be stored in the remote memory storage device. By way of example, and not limitation, FIG. 4 illustrates remote application programs 485 as residing on memory device 481. It will be appreciated that the network connections shown are exemplary and other means of establishing a communications link between the computers may be used.

Various distributed computing frameworks have been and are being developed in light of the convergence of personal computing and the Internet. Individuals and business users alike are provided with a seamlessly interoperable and Web-enabled interface for applications and computing devices, making computing activities increasingly Web browser or network-oriented.

For example, MICROSOFTS®'s .NET™ platform, available from Microsoft Corporation, includes servers, building-block services, such as Web-based data storage, and downloadable device software. While exemplary embodiments herein are described in connection with software residing on a computing device, one or more portions of an embodiment of the invention may also be implemented via an operating system, application programming interface (API) or a "middle man" object between any of a coprocessor, a display device and a requesting object, such that operation may be performed by, supported in or accessed via all of .NET™'s languages and services, and in other distributed computing frameworks as well.

As mentioned above, while exemplary embodiments of the invention have been described in connection with various computing devices and network architectures, the underlying concepts may be applied to any computing device or system in which it is desirable to implement an efficient address translation. Thus, the methods and systems described in connection with embodiments of the present invention may be applied to a variety of applications and devices. While exemplary programming languages, names and examples are chosen herein as representative of various choices, these languages, names and examples are not intended to be limiting. One of ordinary skill in the art will appreciate that there are numerous ways of providing object code that achieves the same, similar or equivalent systems and methods achieved by embodiments of the invention.

The various techniques described herein may be implemented in connection with hardware or software or, where appropriate, with a combination of both. Thus, the methods and apparatus of the invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention.

While aspects of the present invention has been described in connection with the preferred embodiments of the various figures, it is to be understood that other similar embodiments may be used or modifications and additions may be made to the described embodiment for performing the same function of the present invention without deviating therefrom. Furthermore, it should be emphasized that a variety of computer platforms, including handheld device operating systems and other application specific operating systems are contemplated, especially as the number of wireless networked devices continues to proliferate. Therefore, the claimed invention should not be limited to any single embodiment, but rather should be construed in breadth and scope in accordance with the appended claims.

What is claimed:

1. A method of translating graphics-virtual addresses to physical addresses wherein translation tables are stored in main memory, the method comprising:
   executing an application program on a processor in a virtualized operating environment, the application program using a driver to write graphics instructions and graphics virtual addresses into main system memory;
   accessing the graphics instructions in the main system memory by a graphics processor for graphics processing, the graphics instructions comprising references to the graphics virtual address;
   starting execution of the graphics instructions for graphics processing using a graphics processor, the graphics processor absent dedicated hardware for address translation;
   translating the graphics virtual address into a system physical address using translation tables in main system memory, the translation performed independently from the graphics processor; and
   completing execution of the graphics instructions for graphics processing using the system physical address, wherein the graphics operation requested by the application is completed.

2. The method of claim 1, wherein starting execution of the graphics instructions for graphics processing using a graphics processor comprises executing the instructions by the graphics processor which uses main memory space for translation tables rather than GPU dedicated memory.

3. The method of claim 1, wherein translating the graphics virtual address into a system physical address comprises translating the graphics virtual address into a main memory physical address using an I/O memory management unit.

4. The method of claim 3, wherein the I/O memory management unit performs a direct memory access into main memory by translating the graphics virtual address into a main memory physical address and accessing the main memory using a direct memory access process.

5. A computer system to determine a graphics physical address from a graphics virtual address, the system comprising:
   a software application stored in a memory that defines a graphics process to be performed along with at least one graphics virtual address;
   a CPU which executes the software application defining the graphics process;
   a main memory accessible by components in the computer system, comprising graphics instructions of the graphics process and at least one graphics virtual address when the software application causes instructions of the graphics process along with at least one graphics virtual address to be written to said main memory;
   a GPU which accesses the graphics instructions and the at least one graphics virtual address from the main memory; and
   an I/O memory management unit which translates the graphics virtual addresses into main memory physical addresses;
   wherein the GPU executes the graphics instructions and uses the at least one graphics virtual address in conjunction with the I/O memory management unit, the I/O memory management unit translating the at least one graphics virtual address to at least one main memory physical address to perform the graphics operation.

6. The system of claim 5, wherein the software application is an application executed for a guest virtual machine in a virtual machine environment.

7. The system of claim 5, wherein the computer system is a virtual machine computer system.

8. The system of claim 5, wherein the main memory contains the graphics instructions and at the least one graphics virtual address as well as target memory destinations to perform the graphics operation.

9. The system of claim 5, wherein the GPU which accesses the graphics instructions and at the least one graphics virtual address from the main memory is absent GPU-local dedicated address translation ability.

10. The system of claim 5, wherein the I/O memory management unit provides address translation services via a hardware mechanism that accesses translation tables located in main memory.

11. The system of claim 5, wherein the I/O memory management unit uses direct memory access to access in conjunction with address translation to access main memory for the GPU.

12. A computer-readable storage medium having computer-executable instructions for performing a method of performing address translations, the method comprising:
   executing an application program on a processor in a virtualized operating environment, the application program using a driver to write graphics instructions and graphics virtual addresses into main system memory;
   accessing the graphics instructions in the main system memory for graphics processing, the graphics instructions comprising references to the graphics virtual address;
   beginning execution of the graphics instructions for graphics processing using a graphics processor, the graphics processor without dedicated hardware for address translation;

translating the graphics virtual address into a system physical address using translation tables in main memory; the translation performed independently from the graphics processor; and completing execution of the graphics instructions for graphics processing using the system physical address, wherein the graphics operation requested by the application is completed.

13. The computer-readable storage medium of claim 12, wherein the step of receiving a request comprises receiving a request from a guest application of a virtual machine.

14. The computer-readable storage medium of claim 12, further comprising the step of:

storing, by a host CPU, the graphics instructions and the at least one graphics virtual address in system main memory, the instructions and at least one graphics processor to be accessed by the graphics processor.

15. The computer-readable storage medium of claim 12, wherein the step of accessing instructions for graphics processing comprises accessing the graphics instructions and the graphics virtual address data stored in system main memory, the access performed by a graphics processor.

16. The computer-readable storage medium of claim 12, wherein the step of translating the graphics virtual address into a system physical address comprises translating the graphics virtual address into a main memory physical address using an I/O memory management unit.

17. The computer-readable storage medium of claim 16, wherein the I/O memory management unit performs a direct memory access into system main memory by translating the graphics virtual address into a main memory physical address and accessing the main memory.

* * * * *